C. E. DAVIS.
MINING MACHINE.
APPLICATION FILED MAR. 10, 1915.

1,244,179.

Patented Oct. 23, 1917.
2 SHEETS—SHEET 1.

Witnesses:

Inventor.
Charles E. Davis
by Parker & Burton
his Attys.

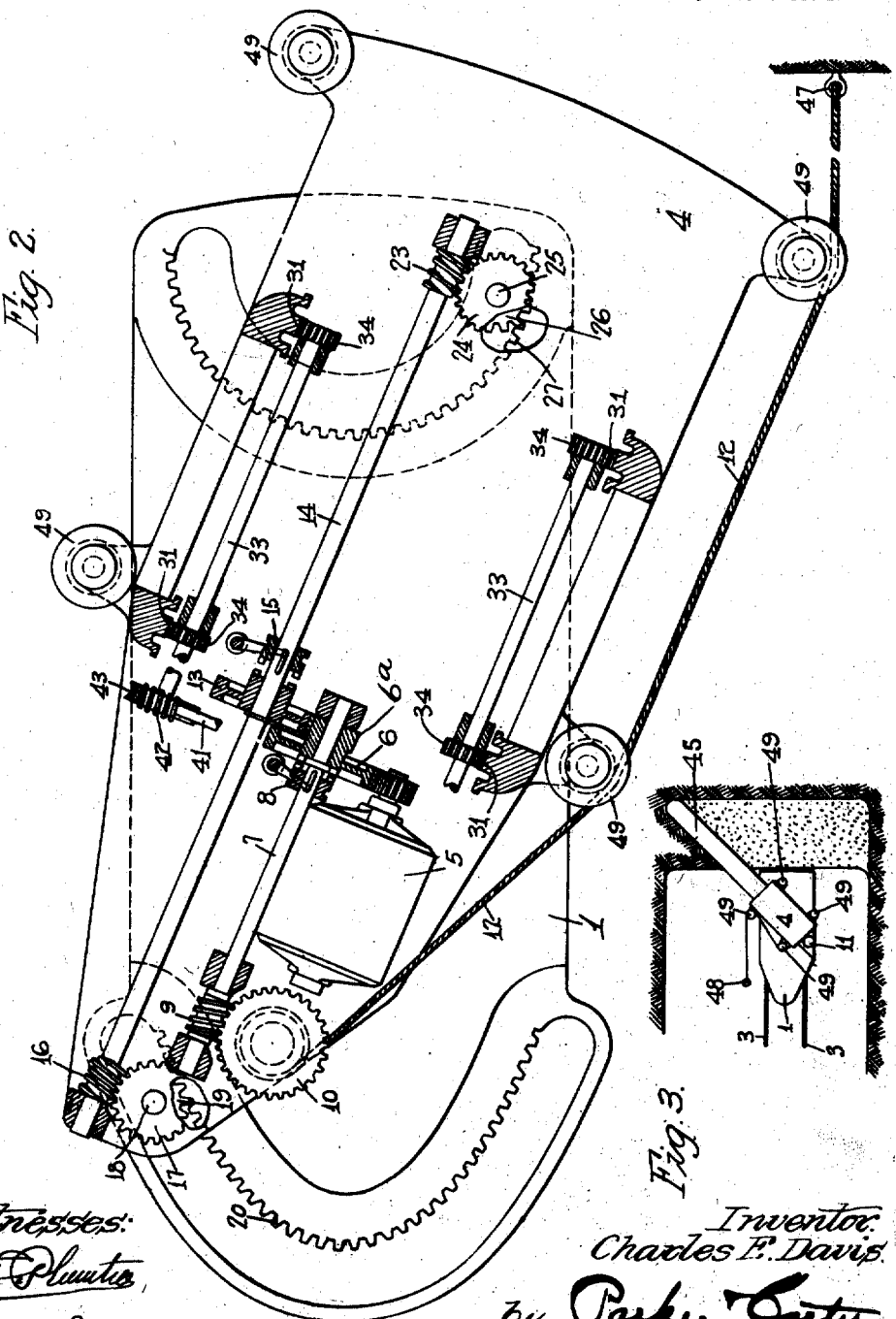

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

MINING-MACHINE.

1,244,179.      Specification of Letters Patent.      Patented Oct. 23, 1917.

Application filed March 10, 1915. Serial No. 13,309.

*To all whom it may concern:*

Be it known that I, CHARLES E. DAVIS, a citizen of the United States, residing at Chicago, in the county of Cook and State of Illinois, have invented a certain new and useful Improvement in Mining-Machines, of which the following is a specification.

This invention relates to mining machines and has for its object to provide a new and improved device of this description particularly adapted to cut a straight face cut. The invention is illustrated in the accompanying drawings, wherein—

Fig. 2 is a sectional view taken on line 2—2 of Fig. 1;

Fig. 3 is a diagrammatic view showing the machine as it approaches the end of its cut.

Like numerals refer to like parts throughout the several figures.

Figure 1:
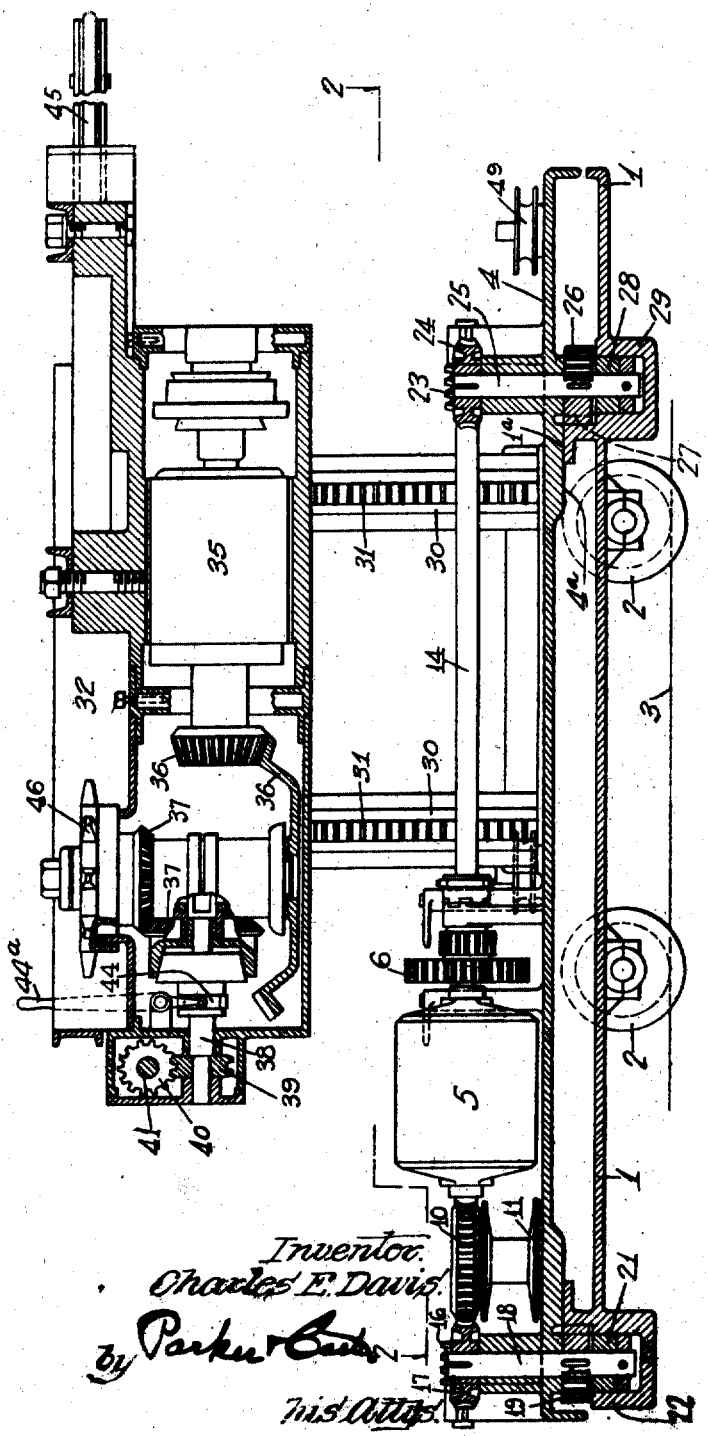
Figure 1 is a vertical sectional view through a machine embodying the invention.

In the construction shown in the drawings I have illustrated a machine having a main frame 1 mounted upon wheels 2, which run upon rails 3. Mounted upon the main frame 1 is a supporting frame 4, which is movable with relation to the frame 1. The frame 4 is provided with a motor 5, which drives a gear 6 loosely mounted on a shaft 7. A clutch member 8 is slidably mounted upon the shaft 7 and is adapted to engage a clutch member on the hub of the gear 6 so as to connect the shaft to the gear. The shaft 7 is provided with a worm 9, which engages a worm wheel 10 to which is connected the drum 11, about which passes the flexible cable 12. Connected with the hub of the gear 6 is a gear 6ª, which drives a gear 13 loosely mounted on the shaft 14. A clutch member 15 is slidably mounted on said shaft and is adapted to engage a clutch member on the hub of the gear 13 so as to drive the shaft when the clutch members are united. The shaft 14 is provided at one end with the worm 16, which engages the worm wheel 17 on the shaft 18 mounted upon the supporting frame 4. A gear 19 is mounted upon the shaft 18 so as to rotate therewith, and engages a curved rack 20 on the main frame 1. The end of the shaft 18 projects beyond the gear 19 and is provided with a guide roller 21, which engages a guiding device 22 so as to prevent the gear 19 from being forced away from the rack when the machine is in operation. At the other end of the shaft 14 is a worm 23, which engages a worm wheel 24 on a shaft 25. A gear 26 is connected with the shaft 25 so as to rotate therewith, said gear engaging a curved rack 27 on the main frame 1. The end of the shaft 25 projects beyond the gear 26 and is provided with a guide roller 28, which engages a guiding device 29 connected with the main frame 1 so as to prevent the gear 26 from being forced out of engagement with the rack 29 when the machine is in operation. The supporting frame 4 has a finished face 4ª, which slides on the finished face 1ª of the main frame. It will therefore be seen that only a small portion of the face of each frame needs to be machined. It will be noted that the racks 27 and 20 are both curved but that they have different curvatures. The supporting frame 4 is provided with the upwardly projecting supports 30 provided with the racks 31. Mounted between these supports is the cutting element 32, which has means for engaging these racks so that the cutting element may be moved up and down between these supports. Any suitable means for this purpose may be used. As herein shown, the cutting element is provided at its sides with shafts 33, upon which are gears 34, which engage the racks 31. The shafts 33 are driven from the motor 35 through the bevel gears 36 and 37, the shaft 38, the worm 39, the worm wheel 40, the shaft 41, the worms 42 (see Fig. 2), and the worm wheels 43 connected with the shaft 33. It will be seen that when these gears 34 are rotated the cutting element may be moved up or down. The connection between the gears 34 and the motor is controlled by the clutch 44 and lever 44ª. The cutting element is provided with a cutter arm 45, which carries the usual cutter chain (not shown), said cutter chain being driven by the sprocket 46.

When it is desired to operate the machine, the entire device is moved up to the face of the coal and the end of the cutter arm is placed in position against the coal at the point where it is desired to force it into the coal. The flexible cable 12 is then connected to a fixed device 47 at the front of the machine, the motor started and clutch member 8 moved to connect the motor with the shaft 7 and the drum 11. The cutter chain is then started and the rotation of the drum 11 forces the cutter arm into the coal. When the cutter arm has reached the proper position the drum 11 is disconnected from the motor and clutch member 15 is moved so as to connect the motor 5 with the shaft 14. This shaft is then rotated, thereby rotating the shafts 18 and 25 and the gears 19 and 26. These gears are at the opposite ends of their respective racks and are rotated in the same direction. This rotation causes them to move along their respective racks in opposite directions, carrying with them the supporting frame 4 and the cutting element. The cutter arm is then moved across the coal, the end thereof moving so as to cut a substantially straight face, as shown in Fig. 3. When the machine reaches the position shown in Fig. 8, the motor is disconnected from the shaft 14 and the flexible cable is connected to a fixed part 48 (see Fig. 8) at the rear of the machine. The motor is then connected with the drum 11 and said drum moved so as to pull the machine bodily to the rear. The cutter chain during all this time is in operation and makes the final withdrawing cut. The frame 4 is provided with a series of direction changing pulleys 49 for the flexible cable 12.

I have described in detail a particular construction embodying the invention, but it is of course evident that the parts may be varied in many particulars, and I therefore do not limit myself to the particular construction shown.

I claim:

1. A mining machine comprising a main frame, a supporting frame mounted thereon, a curved rack connected with each end of the main frame, a pinion engaging each rack, said pinions connected with the supporting frame, means for driving said pinions so as to move the supporting frame with relation to the main frame, and a cutting element carried by said supporting frame.

2. A mining machine comprising a main frame, a supporting frame mounted thereon, a curved rack connected with each end of the main frame, a pinion engaging each rack, said pinions connected with the supporting frame, means for driving said pinion so as to move the supporting frame with relation to the main frame, means for preventing said pinions from being forced away from said racks when the machine is in operation, and a cutting element carried by said supporting frame.

3. A mining machine comprising a main frame, a movable supporting frame mounted thereon, a rack connected with each end of the main frame one of said racks being curved, a pinion engaging each of said racks, said pinions connected with the supporting frame, a shaft extending longitudinally of the supporting frame, said shaft operatively connected with said pinions so as to rotate them.

4. A mining machine comprising a main frame, a supporting frame, a motor mounted on said supporting frame, a horizontal shaft on the supporting frame, operatively connected with said motor, two separated vertical shafts on the supporting frame, operatively connected with the horizontal shaft, said shafts projecting beyond the bottom of said supporting frame, pinions on said vertical shafts, racks on the main frame, with which said pinions engage, and a cutting element mounted upon said supporting frame.

5. A mining machine comprising a main frame, a supporting frame, a motor mounted on said supporting frame, a horizontal shaft on the supporting frame, operatively connected with said motor, two separated vertical shafts on the supporting frame, operatively connected with the horizontal shaft, said shafts projecting beyond the bottom of said supporting frame, pinions on said vertical shafts, racks on the main frame, with which said pinions engage, guiding devices on the main frame for preventing said pinions from moving away from their associated racks, and a cutting element mounted upon said supporting frame.

6. A mining machine comprising a main frame, a supporting frame mounted thereon, two separated pinions connected with said supporting frame, two separated racks connected with the main frame, the pinions engaging said racks, means for causing said pinions to travel along said racks simultaneously and in opposite directions, and a cutting element mounted upon said supporting frame.

7. A mining machine comprising a main frame, a movable supporting frame mounted thereon, a rack connected with each end of said main frame, a pinion engaging each of said racks, said pinions connected with the supporting frame, a shaft extending longitudinally of the supporting frame, and operatively connected with said pinions so as to rotate them, the ends of said shaft moving in opposite directions across said main frame when the shaft is rotated.

8. A mining machine comprising a main frame, a movable supporting frame mounted thereon, a cutter carried by said supporting frame, a rack connected with each end of said main frame, two pinions, one engaging each of said racks, vertical shafts connected with said pinions, a longitudinal shaft carried by said supporting frame and operatively connected with said vertical shafts, whereby when the longitudinal shaft is rotated the pinions engaging the racks are rotated and the supporting frame moved with relation to said main frame, the ends of said longitudinal shaft moving in opposite directions when the shaft is rotated.

9. A mining machine comprising a main frame, a movable supporting frame mounted thereon, a rack connected with each end of the main frame, a pinion engaging each of said racks, vertical shafts connected with said pinions and projecting through the supporting frame, a longitudinal shaft carried by said supporting frame and operatively connected with said vertical shafts, whereby when the longitudinal shaft is rotated the pinions engaging the racks are rotated and the supporting frame moved with relation to the main frame.

In testimony whereof, I affix my signature, in the presence of two witnesses, this 24th day of February, 1915.

CHARLES E. DAVIS.

Witnesses:
MINNIE M. LINDENAU,
ELLA THIEME.